US006124784A

United States Patent [19]
Wells

[11] Patent Number: 6,124,784
[45] Date of Patent: Sep. 26, 2000

[54] OCCUPANT PROTECTION AND SIGNAL APPARATUS AND METHOD

[75] Inventor: Roger Frederick Wells, Yorba Linda, Calif.

[73] Assignee: TRW Inc., Lyndhurst, Ohio

[21] Appl. No.: 09/132,632

[22] Filed: Aug. 11, 1998

[51] Int. Cl.$^7$ ..................................................... B60Q 1/00
[52] U.S. Cl. ...................... 340/438; 340/425.5; 340/430; 340/539; 280/730.2; 280/735; 701/45
[58] Field of Search ................................... 340/438, 436, 340/426, 981, 430, 539, 425.5, 429; 280/735, 730.2; 307/10.1; 701/45

[56] References Cited

U.S. PATENT DOCUMENTS

| | | | |
|---|---|---|---|
| 3,022,392 | 2/1962 | Clemson | 200/61.5 |
| 3,646,583 | 2/1972 | Scuderi | 340/436 |
| 3,760,414 | 9/1973 | Nicolson | 342/21 |
| 3,858,205 | 12/1974 | Ross | 342/21 |
| 3,990,040 | 11/1976 | Gleitz et al. | 340/436 |
| 4,067,411 | 1/1978 | Conley et al. | 340/426 |
| 4,369,426 | 1/1983 | Merkel | 340/904 |
| 4,673,937 | 6/1987 | Davis | 342/72 |
| 4,851,705 | 7/1989 | Musser et al. | 307/10.1 |
| 4,950,915 | 8/1990 | Spies et al. | 307/10.1 |
| 5,187,465 | 2/1993 | Stonerook et al. | 340/438 |
| 5,311,197 | 5/1994 | Sorden et al. | 342/457 |
| 5,322,325 | 6/1994 | Breed et al. | 280/735 |
| 5,373,193 | 12/1994 | Nilsson et al. | 307/10.1 |
| 5,394,142 | 2/1995 | Dusart | 340/981 |
| 5,465,079 | 11/1995 | Bouchard et al. | 340/576 |
| 5,482,314 | 1/1996 | Corrado et al. | 280/735 |
| 5,484,166 | 1/1996 | Mazur et al. | 340/436 |
| 5,574,427 | 11/1996 | Cavallaro | 340/436 |
| 5,579,443 | 11/1996 | Tatematsu et al. | 455/89 |
| 5,605,348 | 2/1997 | Blackburn et al. | 280/735 |
| 5,608,270 | 3/1997 | Meister | 307/10.1 |
| 5,683,103 | 11/1997 | Blackburn et al. | 280/735 |
| 5,808,564 | 9/1998 | Simms et al. | 340/990 |

*Primary Examiner*—Edward Lefkowitz
*Assistant Examiner*—Davetta W. Goins
*Attorney, Agent, or Firm*—Tarolli, Sundheim, Covell, Tummino & Szabo L.L.P.

[57] ABSTRACT

An occupant protection and signal apparatus (10) that is for a vehicle (12) has an air bag module (18). The air bag module (18) includes an inflatable air bag (20) and an inflation fluid source (24) actuatable for protecting a vehicle occupant (14). The air bag module (18) includes an initiator (30) for initiating actuation of the fluid source (24) in response to receipt of an electrical initiation signal (32). Circuitry (40–46) determines a vehicle crash event and, in response thereto, provides the electrical initiation signal (32) to the initiator (30). A sensor (56) detects the electrical initiation signal (32), and a radio beacon controller (50) and antenna (52) broadcast a signal (54) in response to the detection.

37 Claims, 2 Drawing Sheets

OCCUPANT PROTECTION AND SIGNAL APPARATUS AND METHOD

FIELD OF THE INVENTION

The present invention relates to occupant protection systems for vehicles, and particularly relates to signaling for assistance once an occupant is protected.

BACKGROUND OF THE INVENTION

Occupant protection systems for use in vehicles are well known in the art. One type of protection system is an occupant restraint system that includes an inflatable restraint, such as an air bag. The system includes a collision or crash sensor and an actuation circuit that controls deployment of the air bag in response to an output from the collision sensor.

Often, upon the occurrence of a vehicle collision or crash, it becomes necessary for authorities (e.g., a police department and a fire department) to respond to the location of the vehicle collision.

SUMMARY OF THE INVENTION

In accordance with one aspect, the present invention provides an occupant protection and signal apparatus for a vehicle. Protection means is actuatable for protecting a vehicle occupant. The protection means includes initiator circuit means for initiating actuation of the protection means in response to receipt of an electrical initiation signal. Control means determines the occurrence of a condition for which the occupant is to be protected and provides the electrical initiation signal to the protection means in response to the determination. Beacon means detects the electrical initiation signal and broadcasts a signal in response to the detection.

In accordance with another aspect, the present invention provides an occupant protection and signal apparatus for a vehicle. The apparatus comprises an inflatable air bag, and a source of inflation fluid for the air bag. An initiator is actuatable in response to receipt of an initiation signal to cause the source of inflation fluid to provide inflation fluid to the air bag. Circuitry provides the initiation signal to the initiator when an occupant is to be protected by the air bag. A sensor detects the initiation signal. Circuitry broadcasts a signal when the sensor detects the initiation signal.

In accordance with another aspect, the present invention provides a method of protecting a vehicle occupant and signaling. The occurrence of a condition for which a vehicle occupant is to be protected is determined. An electrical initiation signal is provided to an occupant protection device in response to the determination. The protection device is actuated in response to receipt of the electrical initiation signal. The electrical initiation signal is detected. A signal is broadcast in response to the detection.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein.

DESCRIPTION OF THE PREFERRED EMBODIMENT

Figure 1:
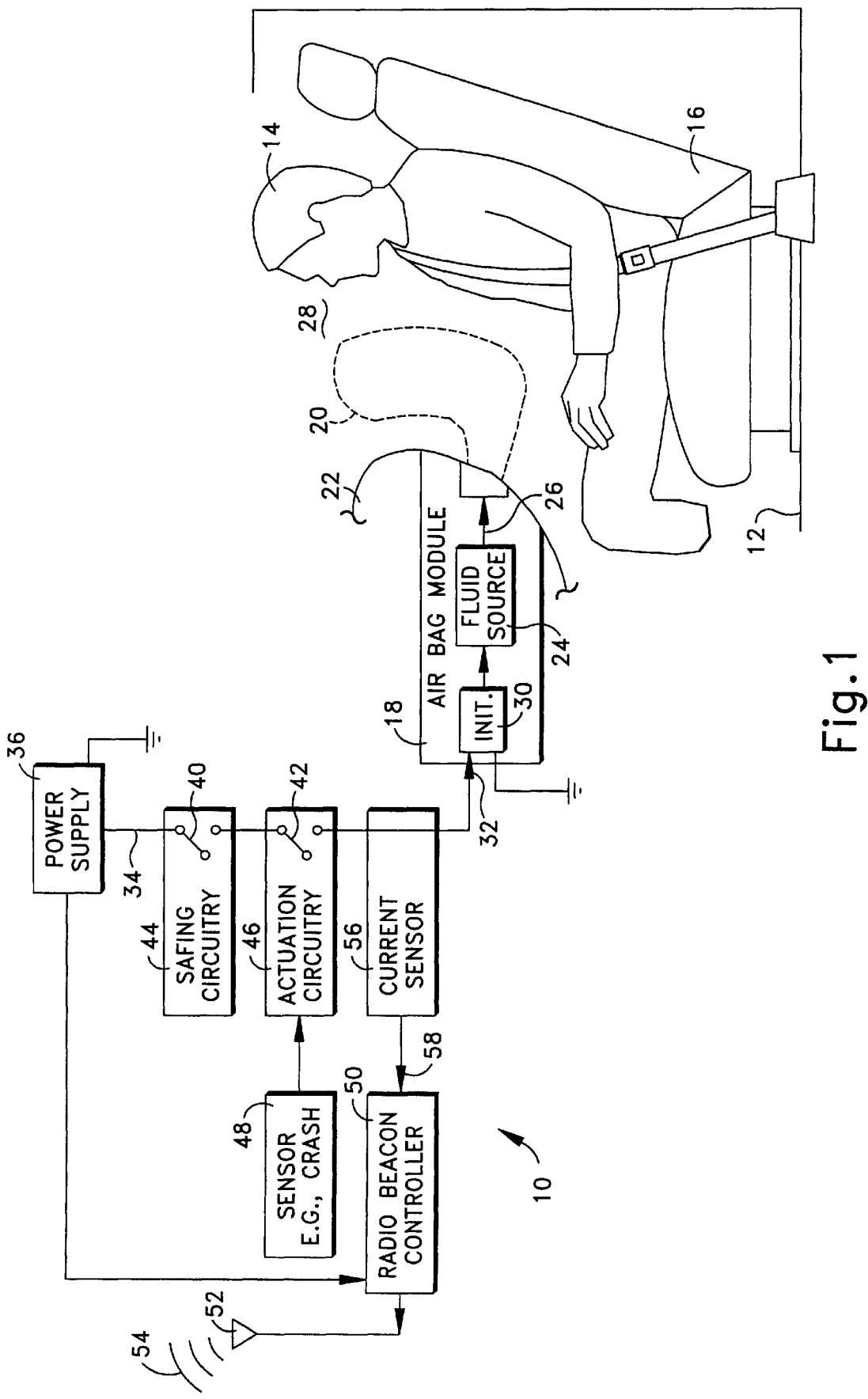
FIG. 1 is a schematic illustration of a vehicle occupant protection and signal apparatus in accordance with the present invention, within an associated vehicle.

An occupant protection and signal apparatus 10 is schematically shown within a vehicle 12 in FIG. 1. The apparatus 10 is provided for a vehicle occupant 14, who is a front-seat passenger and who is seated on a vehicle seat 16 within the vehicle 12. The apparatus 10 includes an actuatable occupant protection module 18 having an inflatable protection device 20. The inflatable protection device 20 is commonly referred to as an air bag, and is illustrated as a dash outline in FIG. 1 to represent an inflated position of the air bag.

Prior to inflation deployment, the air bag 20 is folded and stored within an instrument panel 22 of the vehicle 12, as is known in the art. A source 24 of inflation fluid (e.g., an inert gas) is operatively connected to the air bag 20. Inflation fluid 26 (schematically represented by an arrowhead) from the source 24 is generated by combustion of pyrotechnic material and/or released from a pressurized container to fill the air bag 20 to the inflated condition within an occupant compartment 28 of the vehicle 12. Once inflated, the air bag 20 hopefully helps protect the occupant 14.

Other occupant protection devices that can be used with the present invention include, for example, actuatable seat belts, inflatable knee bolsters, inflatable headliners, and inflatable side curtains. It is to be appreciated that the apparatus 10 in accordance with the present invention may be configured differently and provided for a different vehicle occupant (e.g., the vehicle driver).

Inflation of the air bag 20 by the fluid source 24 is initiated (represented in FIG. 1 by an arrowhead) by an initiator 30. The initiator 30 is energized by an electrical signal 32 (represented in FIG. 1 by an arrowhead) that is provided on a line 34 extending from a power supply 36. Preferably, the signal 32 is a flow of electrical current of sufficient magnitude and duration to actuate the initiator. It is to be noted that the illustrated line 34 is a simplified representation and that the line 34 may be comprised of electrical connections that extend through various components. The power supply 36 includes a battery and a voltage regulator of the vehicle 12, and may also include energy reserve circuitry such as a capacitor.

The initiator 30 may be of any suitable type for causing initiation of the flow of inflation fluid, such as a pyrotechnic squib or a semiconductor bridge circuit. As examples of the the operation of the initiator 30 when the electrical signal 32 is provided to the initiator 30, the initiator causes combustion of a pyrotechnic material and/or ruptures a burst disk, depending upon the type of structure of the fluid source 24.

The flow of the electrical signal 32 to the initiator 30 is controlled by at least one switching device connected in series between the power supply 36 and the initiator 30. Closure of the switching device in response to crash acceleration results in the air bag 20 being inflated for a situation in which the occupant 14 is to be protected. There are several situations for which the air bag 20 is inflated to protect the occupant 14. Some examples of such situations include a particular type of vehicle crash or collision event, or a vehicle rollover event. For simplicity, and not for the purpose of limitation, the present invention is described via an embodiment for the vehicle crash situation.

In the embodiment shown in FIG. 1 there are two switching devices 40 and 42 (schematically represented). It is to be appreciated that the switching devices 40 and 42 may be mechanical switches, solid-state (e.g., transistor) switches, etc. It is to be further appreciated that the switching devices 40 and 42 may not completely disconnect the line 34, but merely block the electrical signal 32. Such an arrangement would permit circuit testing, non-actuation communication, etc.

The first series connected switching device 40 is part of safing circuitry 44. The switching device 40 is connected to the power supply 36. The safing circuitry 44 includes components and/or circuits for controlling the first switching device 40 such that the first switching device is open (blocking the electrical signal 32 from the power supply 36) when the vehicle 12 is not involved in a particular type of crash event and is closed upon the occurrence of the particular type of crash event. Thus, the first switching device 40 is a normally open switching device.

In one embodiment, the safing circuitry 44 includes an inertia responsive component that causes the first switching device 40 to close when the sensed crash acceleration exceeds a predetermined threshold value (e.g., a value greater than normal braking of the vehicle). Safing circuitry and inertia responsive components, are known in the art and are not discussed further herein for brevity.

The second series connected switching device 42 is part of actuation circuitry 46 and is connected in series with switching device 40. The actuation circuitry 46 includes components and/or circuits for controlling the second switching device 42 such that the second switching device is open (blocking the electrical signal 32 from the power supply 36) when the vehicle is not involved in a crash and is closed upon the occurrence of a vehicle crash event. Preferably, the actuation circuitry 46 includes a controller that has a microcomputer.

The controller of the actuation circuitry 46 receives sensory input from at least one source (e.g., 48) and, using the sensory input, makes determinations regarding control of the second switching device 42. Such a process is commonly referred to as a deployment or "fire" control determination for the air bag module 18. In one example, the controller of the actuation circuitry 46 performs a crash algorithm. Accordingly, at least one sensory input to the actuation circuitry is a sensor 48 that senses a vehicle condition indicative of a vehicle crash and provides a signal to the controller that is indicative of the sensed vehicle condition. In one preferred embodiment, the sensor is an accelerometer, and the signal is an electrical signal having a characteristic (e.g., voltage, frequency) indicative of the sensed crash acceleration.

It is to appreciated that a plurality of sensors could be included to provide signals to the actuation circuitry 46. The plurality of signals would be indicative of a variety of vehicle and/or occupant conditions for which the occupant 14 is to be protected. Specific configurations of the actuation circuitry and crash algorithms, which are performed by the microcomputer within such actuation circuitry, are known in the art and are not discussed herein for brevity.

When a deployment crash condition (a condition in which protection of the occupant 14 is desired) occurs, the safing circuitry 44 and the actuation circuitry 46 close the respective switching devices 40 and 42 thereby permitting the electrical signal 32 to proceed to the initiator 30. Often, when a deployment crash condition occurs, it is desirable for municipal authorities (e.g., a police department, and a fire department), or other person or agency, to proceed to the location of the vehicle 12. Before the authorities, etc. can proceed to the location of the vehicle 12, the authorities, etc. must be made aware of the need to proceed to the vehicle location.

The apparatus 10 includes a radio beacon controller 50 and an antenna 52 for notifying the authorities, etc. The radio beacon controller 50 causes the antenna 52 to broadcast a radio frequency ("RF") signal 54, which is intended to be received by the authorities, etc., upon the occurrence of the electrical signal 32 being provided to the initiator 30. Also, the authorities can use the broadcast signal 54 to locate the vehicle 12 (i.e., track or "home-in" on the signal 54).

The radio beacon controller 50 is operatively connected to a sensor 56, which detects the electrical signal 32 and outputs a signal 58 to the radio beacon controller 50. Preferably, the sensor 56 is a current sensor and detects the flow of current (e.g., a current value exceeding 100 milliamperes) representing the electrical signal 32 from the power supply 36 to the initiator 30 when both switching devices 40 and 42 close.

In the disclosed embodiment, the current sensor 56 is a Hall effect sensor which senses the flow of current through the line 34 and provides the signal 58 having a voltage indicative of the value of the sensed current. Thus, the electrical signal 32 is detected via the electromagnetic field permeating the space surround the line 34. Construction of a Hall effect current sensor is known in the art, and a specific construction of the Hall effect current sensor 56 is not discussed herein for brevity.

Figure 2:
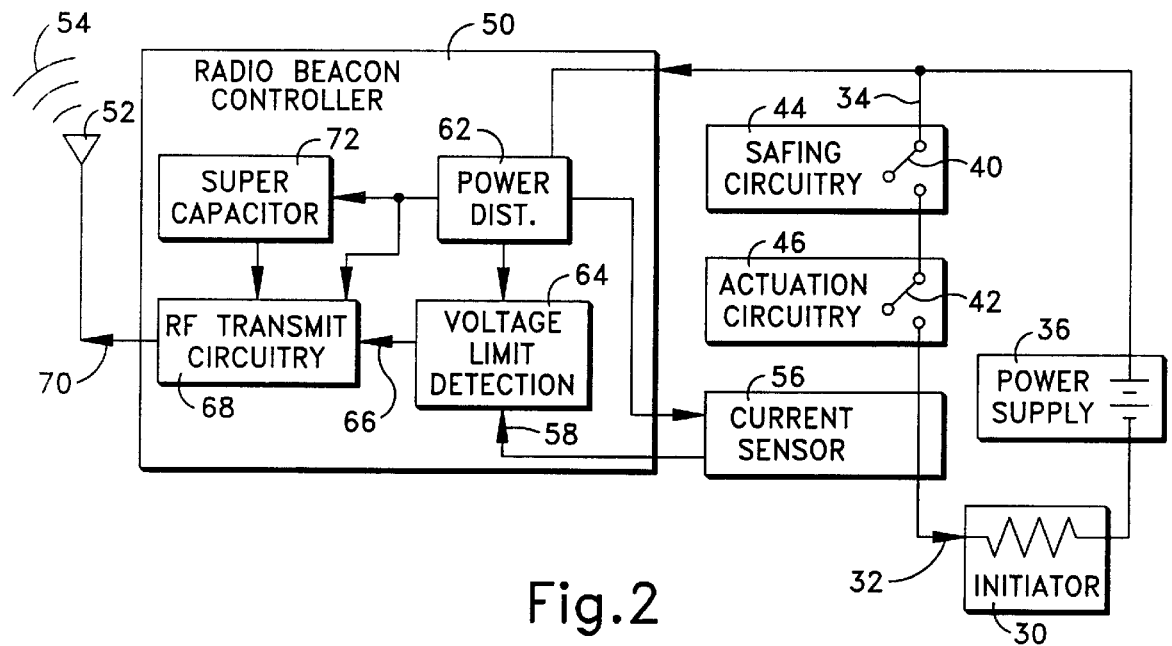
FIG. 2 is a schematic block diagram showing further detail of the circuitry shown in FIG. 1.

FIG. 2 illustrates an embodiment of the radio beacon controller 50 that includes a power distribution network 62 for supplying electrical energy to each of the components of the radio beacon controller. In the illustrated embodiment, electrical energy is also provided from the power distribution network 62 to the current sensor 56.

The output signal 58 from the current sensor 56 is operatively connected to a voltage limit detection function 64 of the radio beacon controller 50. A preset voltage threshold value is held (e.g., stored, programmed) within the voltage limit detection function 64. When the output signal 58 provided by the current sensor 56 exceeds the preset threshold, the voltage limit detection function 64 determines that the electrical signal 32 is being supplied to the initiator 30. In response to the voltage of the output signal 58 from the current sensor 56 exceeding the preset threshold value, the voltage limit detection function outputs a signal 66 to RF transmit circuitry 68 of the radio beacon controller 50. The voltage limit detection function 64 may have any suitable structure for accomplishing this function. In one example, a comparator having one input connected to a regulated reference voltage is utilized to provide the voltage limit detection function 64.

In response to the signal 66 from the voltage limit detection function 64, the RF transmit circuitry 68 outputs an electrical signal 70 to the antenna 52. The signal 70 is preferably a serial signal, and contains an appropriate message that conveys information that a deployment crash condition has occurred and that the air bag 20 was deployed. Other information, such as vehicle position, could be conveyed. It is to be appreciated that additional circuitry (e.g., an on-board global positioning system) may be required to permit conveyance of such other information. In response to the stimulus of the signal 70, the antenna 52 broadcasts the signal 54. Specific circuit arrangements for an RF transmitter are known in the art and are not discussed herein for brevity.

The radio beacon controller 50 also includes a super capacitor 72 operatively connected to the power distribution network 62 and the RF transmit circuitry 68. The super capacitor 72 provides a back-up supply of energy to power the RF transmit circuitry 68 for a period of time if the power supply 36 and/or the power distribution network are disrupted during a crash event. Thus, the authorities are still alerted to the occurrence of the vehicle crash, and can still "home-in" on the signal 54, even if power is disrupted. In one embodiment, the super capacitor 72 is capable of being charged very quickly, is capable of holding the charge for long period of time, and is capable of powering the RF transmit circuitry 68 for, at least, several minutes.

Figure 3:
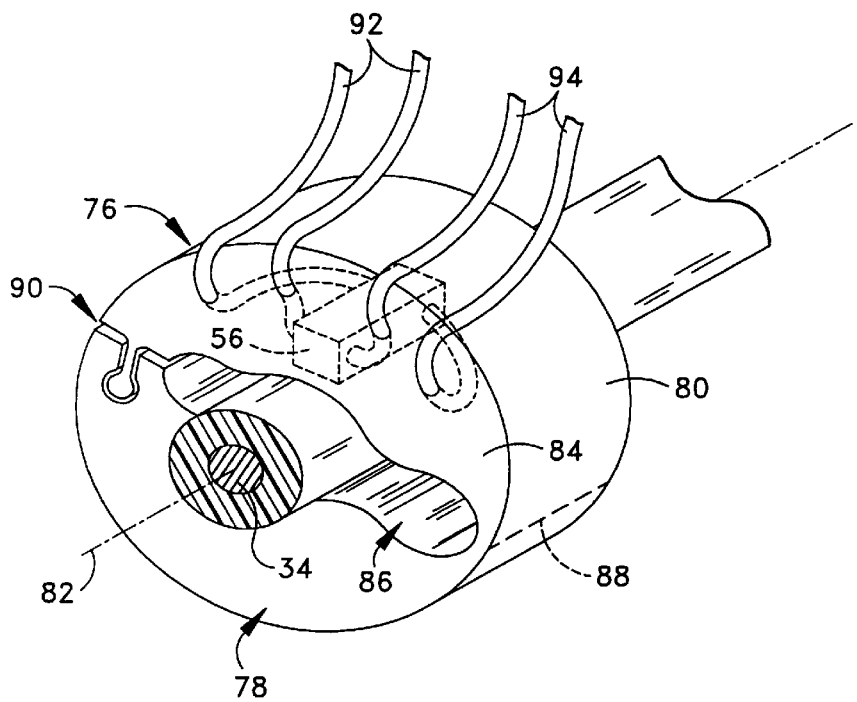
FIG. 3 is a perspective view of an initiation signal sensor connector arrangement for the apparatus of FIG. 1.

FIG. 3 illustrates a connector arrangement 76 for securing the Hall effect current sensor 56 adjacent to the line 34 (shown as an electrically conductive wire with an insulating sheath) which conveys the electrical signal 32. Specifically, the connector arrangement 76 includes a disk-shaped plastic housing 78. The housing 78 has a generally cylindrical, radially outer surface 80 that is located at a radius from the axis 82 of the line 34. Two end faces 84 (only one is visible) of the housing 78 extend substantially parallel to each other and substantially perpendicular to the axis 82 of the line 34. The housing 78 has a passageway 86 through which the line 34 extends.

The housing 78 is formed such that at one side of the passageway 86, a portion 88 acts as a hinge between first and second halves of the housing. A snap-lock connection 90 is located diametrically opposite to the hinge portion 88. At the snap-lock connection 90, interlocking portions (e.g., a bead and a groove) are formed such that when the halves are pressed together, the portions snap together and the two halves are retained in engagement with each other around the line 34. The current sensor 56 is molded into the plastic housing 78 adjacent to the passageway 86, such that the current sensor 56 is held against the line 34 when the connector arrangement 76 is attached to the line 34. Lines 92 extend through the housing 78 to the current sensor 56 for delivering electrical energy to the current sensor. Also, signal lines 94 extend through the plastic connector to the current sensor 56 and to the voltage limit detection function 64 of the radio beacon controller 50 for carrying the signal 58.

In the illustrated embodiment, the current sensor 56 detects the electrical signal 32 without becoming part of the circuit (i.e., the line 34) that conveys the signal to the initiator 30. Such an embodiment has an advantage that the circuit for conveying the electrical signal 32 need not be modified, further complicated, etc. However, it is to be appreciated that the present invention contemplates other embodiments in which the electrical signal 32 is sensed (e.g., such as by other current sensing means). Such other embodiments may include sensing within the signal conveying circuit, e.g., using a current sense resistor, etc.

From the above description of the invention, those skilled in the art will perceive improvements, changes and modifications. Such improvements, changes and modifications within the skill of the art are intended to be covered by the appended claims.

Having described the invention, the following is claimed:

1. An occupant protection and signal apparatus for a vehicle, said apparatus comprising:

protection means actuatable for protecting a vehicle occupant, said protection means including initiator circuit means for initiating actuation of said protection means in response to receipt of an electrical initiation signal having a current flowing to said initiator circuit means;

means for determining the occurrence of a condition for which the occupant is to be protected and for providing said electrical initiation signal to said protection means in response to said determination; and beacon means for detecting the current of said electrical initiation signal flowing to said initiator circuit means and for broadcasting a signal in response to said detection.

2. An apparatus as set forth in claim 1, wherein said beacon means includes non-contact current sensor means for detecting a current of said electrical initiation signal.

3. An apparatus as set forth in claim 2, wherein said beacon means includes means for determining whether the detected current of said electrical initiation signal exceeds a predetermined value.

4. An apparatus as set forth in claim 2, wherein said current sensor means includes a Hall effect sensor.

5. An apparatus as set forth in claim 4, wherein said Hall effect sensor outputs a voltage signal having a voltage value indicative an amount of current detected by said Hall effect sensor, said beacon means includes means for determining whether the voltage of the voltage signal exceeds a predetermined voltage value.

6. An apparatus as set forth in claim 2, including a circuit connecting said protection means and said means for providing said electrical initiation signal, said electrical initiation signal is provided to said protection means via said circuit, said current sensor means includes means inductively coupled to said circuit for sensing an electromagnetic field caused by said circuit.

7. An apparatus as set forth in claim 1, wherein said beacon means includes means for transmitting said broadcast signal as a radio frequency signal.

8. An apparatus as set forth in claim 1, wherein said beacon means includes a back-up supply of electrical energy for use within said beacon means.

9. An apparatus as set forth in claim 8, wherein said back-up supply of electrical energy includes a super capacitor.

10. An occupant protection and signal apparatus for a vehicle, said apparatus comprises:

an actuatable restraint;

an initiator that is actuatable in response to receipt of an initiation signal to actuate said restraint;

circuitry that provides said initiation signal to said initiator in response to a vehicle crash event;

a sensor for detecting said initiation signal provided by said circuitry and received by said initiator; and circuitry that broadcasts a signal when said sensor detects said initiation signal.

11. An apparatus as set forth in claim 10, wherein said sensor is a Hall effect sensor.

12. A method of protecting a vehicle occupant and signaling, said method comprising:

determining the occurrence of a vehicle crash event;

providing an electrical initiation signal having a current to an occupant protection device in response to said determination;

actuating the protection device in response to receipt of the electrical initiation signal;

detecting a current flow of the electrical initiation signal to the occupant protection device; and broadcasting a signal in response to said detection.

13. A method as set forth in claim 12, wherein said step of detecting a current flow of the electrical initiation signal includes detecting an electromagnetic field caused by the current flow of the electrical initiation signal.

14. A method as set forth in claim 12, wherein said step of broadcasting a signal includes broadcasting an RF signal for a period of time after the protection device is actuated.

15. A method as set forth in claim 12, wherein said step of actuating includes actuating an inflatable air bag.

16. An occupant protection and signal apparatus for a vehicle, said apparatus comprising:

protection means deployable for protecting a vehicle occupant, said protection means including initiator circuit means for initiating deployment of said protection means in response to receipt of an electrical initiation signal;

means for determining the occurrence of a condition for which the occupant is to be protected and for providing said electrical initiation signal to said protection means in response to said determination; and beacon means for detecting said electrical initiation signal and broadcasting a signal in response to said detection.

17. An apparatus as set forth in claim 16, wherein said beacon means includes non-contact current sensor means for detecting a current of said electrical initiation signal.

18. An apparatus as set forth in claim 17, wherein said beacon means includes means for determining whether the detected current of said electrical initiation signal exceeds a predetermined value.

19. An apparatus as set forth in claim 17, wherein said current sensor means includes a Hall effect sensor.

20. An apparatus as set forth in claim 19, wherein said Hall effect sensor outputs a voltage signal having a voltage value indicative an amount of current detected by said Hall effect sensor, said beacon means includes means for determining whether the voltage of the voltage signal exceeds a predetermined voltage value.

21. An apparatus as set forth in claim 17, including a circuit connecting said protection means and said means for providing said electrical initiation signal, said electrical initiation signal is provided to said protection means via said circuit, said current sensor means including means inductively coupled to said circuit for sensing an electromagnetic field caused by said circuit.

22. An occupant protection and signal apparatus for a vehicle, said apparatus comprising:

restraint means actuatable for protecting a vehicle occupant, said restraint means including initiator circuit means for initiating actuation of said restraint means in response to receipt of an electrical initiation signal;

means for determining the occurrence of a condition for which the occupant is to be protected and for providing said electrical initiation signal to said restraint means in response to said determination; and beacon means for detecting said electrical initiation signal and broadcasting a signal in response to said detection.

23. An apparatus as set forth in claim 22, wherein said beacon means includes non-contact current sensor means for detecting a current of said electrical initiation signal.

24. An apparatus as set forth in claim 23, wherein said beacon means includes means for determining whether the detected current of said electrical initiation signal exceeds a predetermined value.

25. An apparatus as set forth in claim 23, wherein said current sensor means includes a Hall effect sensor.

26. An apparatus as set forth in claim 25, wherein said Hall effect sensor outputs a voltage signal having a voltage value indicative an amount of current detected by said Hall effect sensor, said beacon means includes means for determining whether the voltage of the voltage signal exceeds a predetermined voltage value.

27. An apparatus as set forth in claim 23, including a circuit connecting said protection means and said means for providing said electrical initiation signal, said electrical initiation signal is provided to said protection means via said circuit, said current sensor including means inductively coupled to said circuit for sensing an electromagnetic field caused by said circuit.

28. An apparatus comprising:

an air bag module having an electrically responsive initiator;

a conductor line extending to the initiator;

a current sensor located adjacent to said conductor line, and providing an output;

a beacon device connected to receive the output of said current sensor.

29. An apparatus as set forth in claim 28, including a sensor-containing connector connected onto said connector line.

30. An apparatus as set forth in claim 28, wherein said current sensor is a Hall effect sensor and senses an electromagnetic field permeating the space surrounding said connector line.

31. An apparatus as set forth in claim 30, wherein the output of said Hall effect sensor is a voltage that is proportional to a current flowing through said conductor line.

32. An apparatus as set forth in claim 28, wherein said initiator is part of a circuit containing said conductor line and not containing said sensor.

33. An apparatus as set forth in claim 28, wherein said sensor is not electrically connected to said connector line.

34. An apparatus comprising:

an occupant protection device for protecting a vehicle occupant via engagement with the occupant;

a conductor line for delivering an electrical signal to said protection device;

a sensor for sensing the signal on said conductor line;

a beacon device, connected to said sensor, for sending a signal when said sensor senses the signal on said conductor.

35. An apparatus as set forth in claim 34, wherein said protection device is an air bag module having an inflatable air bag.

36. An apparatus as set forth in claim 34, wherein said protection device has an initiator that is part of a circuit containing said conductor line and not containing said sensor.

37. An apparatus as set forth in claim 34, wherein said sensor is not electrically connected to said connector line.

\* \* \* \* \*